United States Patent
Lee et al.

(10) Patent No.: US 10,826,039 B2
(45) Date of Patent: Nov. 3, 2020

(54) ELECTRODE ASSEMBLY INCLUDING ELECTRODE AND SEPARATOR PARTIALLY BONDED TO EACH OTHER

(71) Applicant: LG CHEM, LTD., Seoul (KR)

(72) Inventors: Sang Kyun Lee, Daejeon (KR); Ju Hyeon Cho, Daejeon (KR); Cha-Hun Ku, Daejeon (KR); Seok Jin Kim, Daejeon (KR); Duck Hoe Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 58 days.

(21) Appl. No.: 16/315,747

(22) PCT Filed: Aug. 10, 2017

(86) PCT No.: PCT/KR2017/008682
§ 371 (c)(1),
(2) Date: Jan. 7, 2019

(87) PCT Pub. No.: WO2018/030810
PCT Pub. Date: Feb. 15, 2018

(65) Prior Publication Data
US 2019/0355951 A1 Nov. 21, 2019

(30) Foreign Application Priority Data

Aug. 12, 2016 (KR) .................. 10-2016-0103224
Sep. 23, 2016 (KR) .................. 10-2016-0121808

(51) Int. Cl.
*H01M 2/16* (2006.01)
*B32B 37/12* (2006.01)
(Continued)

(52) U.S. Cl.
CPC ............ *H01M 2/168* (2013.01); *B32B 37/12* (2013.01); *H01M 2/1646* (2013.01);
(Continued)

(58) Field of Classification Search
CPC .......................... H01M 2/1673; H01M 2/168
See application file for complete search history.

(56) References Cited

U.S. PATENT DOCUMENTS 8,257,857 B2 9/2012 Lee et al.
9,306,202 B2 4/2016 Kim
(Continued)

FOREIGN PATENT DOCUMENTS

JP 2000-294229 A 10/2000
JP 2014-32935 A 2/2014
(Continued)

OTHER PUBLICATIONS

Machine Translation of KR20160028730A (Apr. 29, 2020) (Year: 2020).*
(Continued)

*Primary Examiner* — Matthew J Merkling
(74) *Attorney, Agent, or Firm* — Birch, Stewart, Kolasch & Birch, LLP

(57) ABSTRACT

An electrode assembly for a secondary battery having reduced internal resistance while adhesion between a separator and an electrode is maintained and having improved electrolyte impregnation the electrode assembly including a separator having a processed area having undergone a corona discharging process and a non-processed area.

16 Claims, 13 Drawing Sheets

(51) Int. Cl.
*H01M 4/62* (2006.01)
*H01M 10/04* (2006.01)
*H01M 10/0525* (2010.01)

(52) U.S. Cl.
CPC ....... *H01M 2/1653* (2013.01); *H01M 2/1686* (2013.01); *H01M 4/622* (2013.01); *H01M 10/04* (2013.01); *H01M 10/0525* (2013.01)

(56) References Cited

U.S. PATENT DOCUMENTS

| | | |
|---|---|---|
| 10,115,950 B2 | 10/2018 | Lee et al. |
| 2004/0197652 A1 | 10/2004 | Kimura et al. |
| 2007/0054183 A1 | 3/2007 | Kim et al. |
| 2011/0146064 A1 | 6/2011 | Feaver et al. |
| 2011/0195294 A1 | 8/2011 | Lee et al. |
| 2014/0377631 A1 * | 12/2014 | Park ............... H01M 2/168 429/144 |
| 2015/0263324 A1 | 9/2015 | Lee et al. |
| 2015/0357671 A1 * | 12/2015 | Park ............ H01M 10/0583 429/217 |
| 2017/0309953 A1 | 10/2017 | Harayama et al. |
| 2018/0034028 A1 * | 2/2018 | Jung ............... H01M 2/10 |
| 2019/0221808 A1 * | 7/2019 | Honda ............ H01M 10/0583 |

FOREIGN PATENT DOCUMENTS

| | | |
|---|---|---|
| KR | 10-2000-0075083 A | 12/2000 |
| KR | 10-1029672 B1 | 4/2011 |
| KR | 10-2012-0081997 A | 7/2012 |
| KR | 10-2012-0111078 A | 10/2012 |
| KR | 10-2014-0064599 A | 5/2014 |
| KR | 10-2015-0028537 A | 3/2015 |
| KR | 10-2015-0038643 A | 4/2015 |
| KR | 10-2015-0049481 A | 5/2015 |
| KR | 10-2016-0024089 A | 3/2016 |
| KR | 10-2016-0028730 A | 3/2016 |
| KR | 10-2016-0046523 A | 4/2016 |
| KR | 10-2017-0053674 A | 5/2017 |
| WO | WO 00/60690 A1 | 10/2000 |
| WO | WO 03/012896 A1 | 2/2003 |
| WO | WO 2016/059464 A1 | 4/2016 |
| WO | WO-2016059464 A1 * | 4/2016 ............ H01M 2/168 |

OTHER PUBLICATIONS

European Office Action, dated Jul. 19, 2019, for European Application No. 17839827.7.
Extended European Search Report, dated Jul. 3, 2019, for European Application No. 17839827.7.
International Search Report for PCT/KR2017/008682 dated Nov. 15, 2017.

* cited by examiner

[FIG. 1]
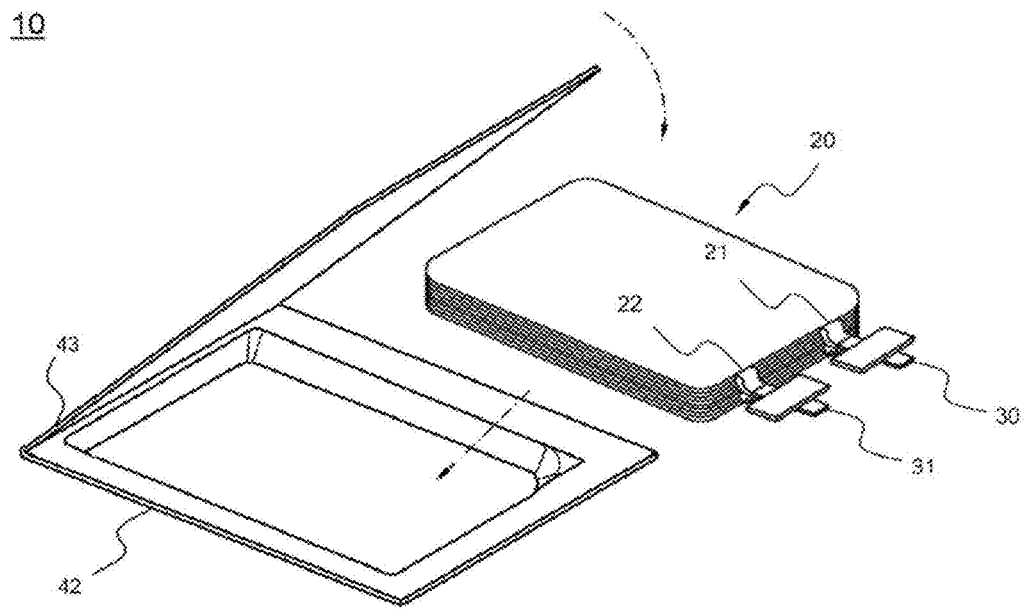
Conventional Art
[FIG. 2]
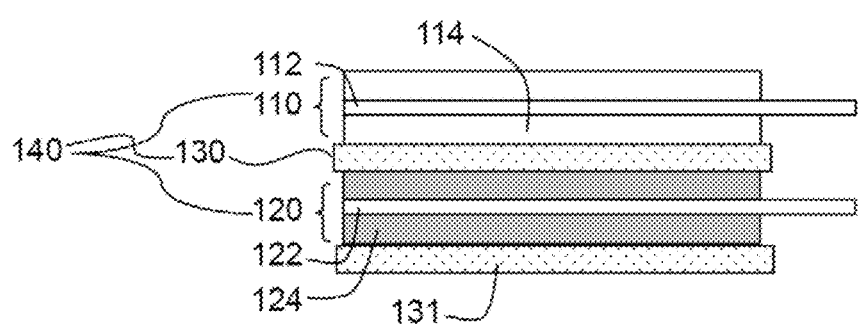

[FIG. 3]
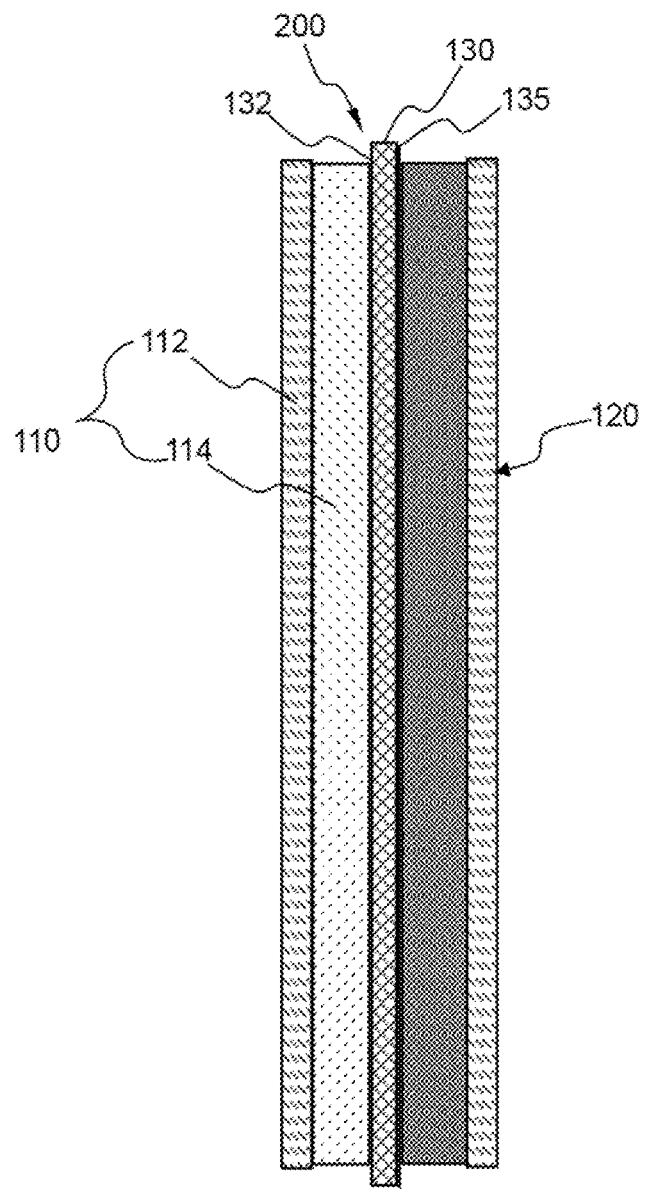

[FIG. 4]
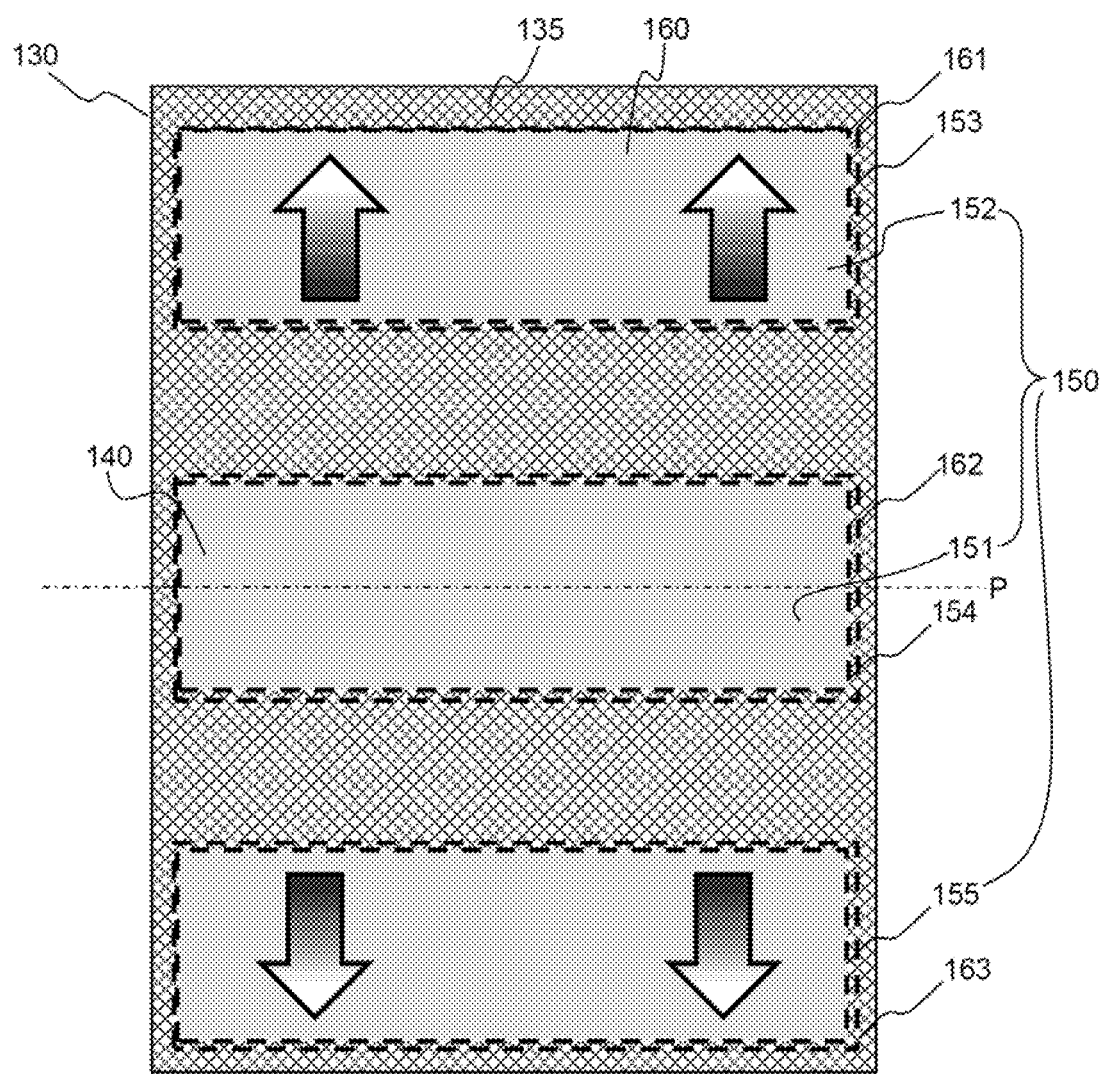

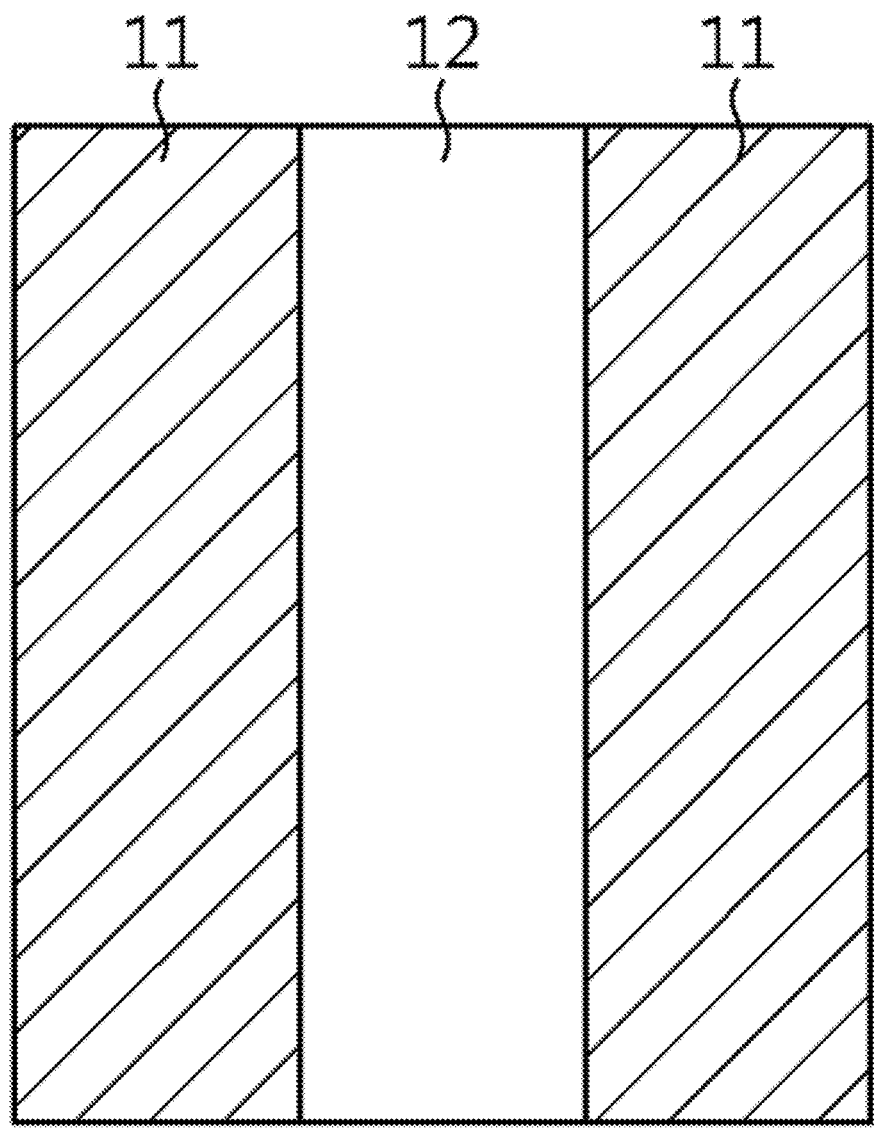
[FIG. 5]

[FIG. 6]
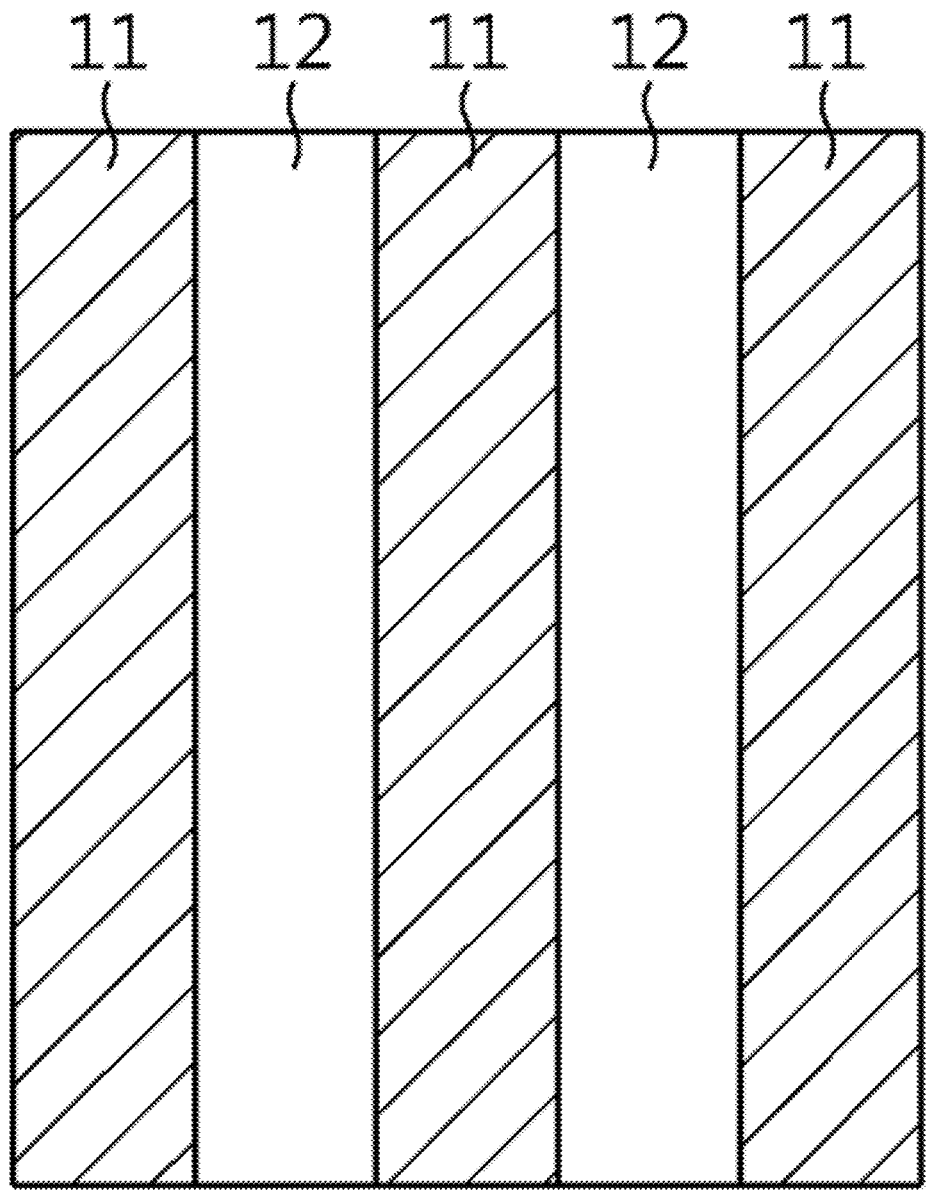

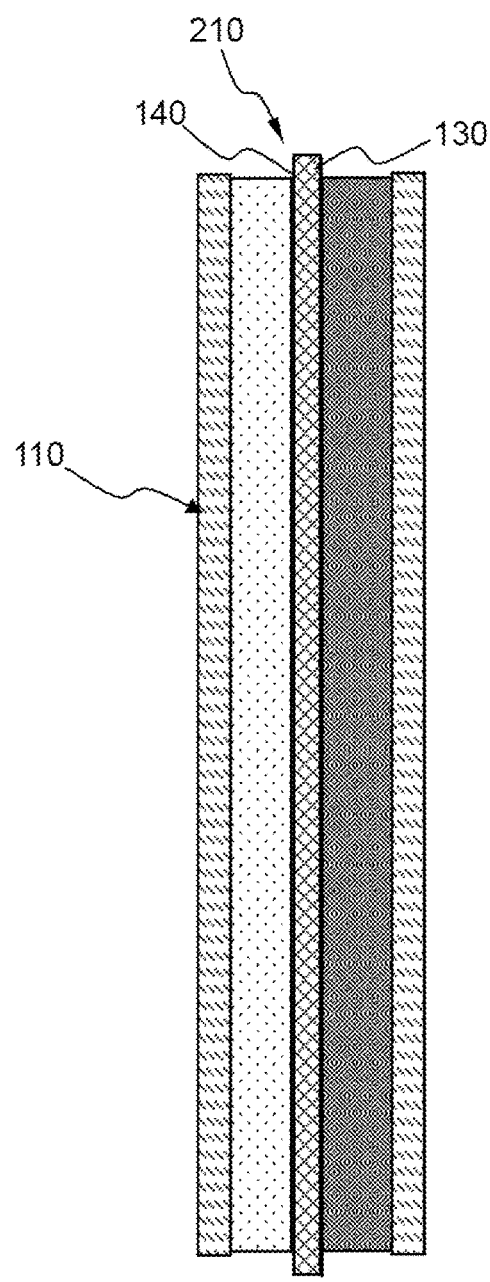
[FIG. 7]

[FIG. 8]
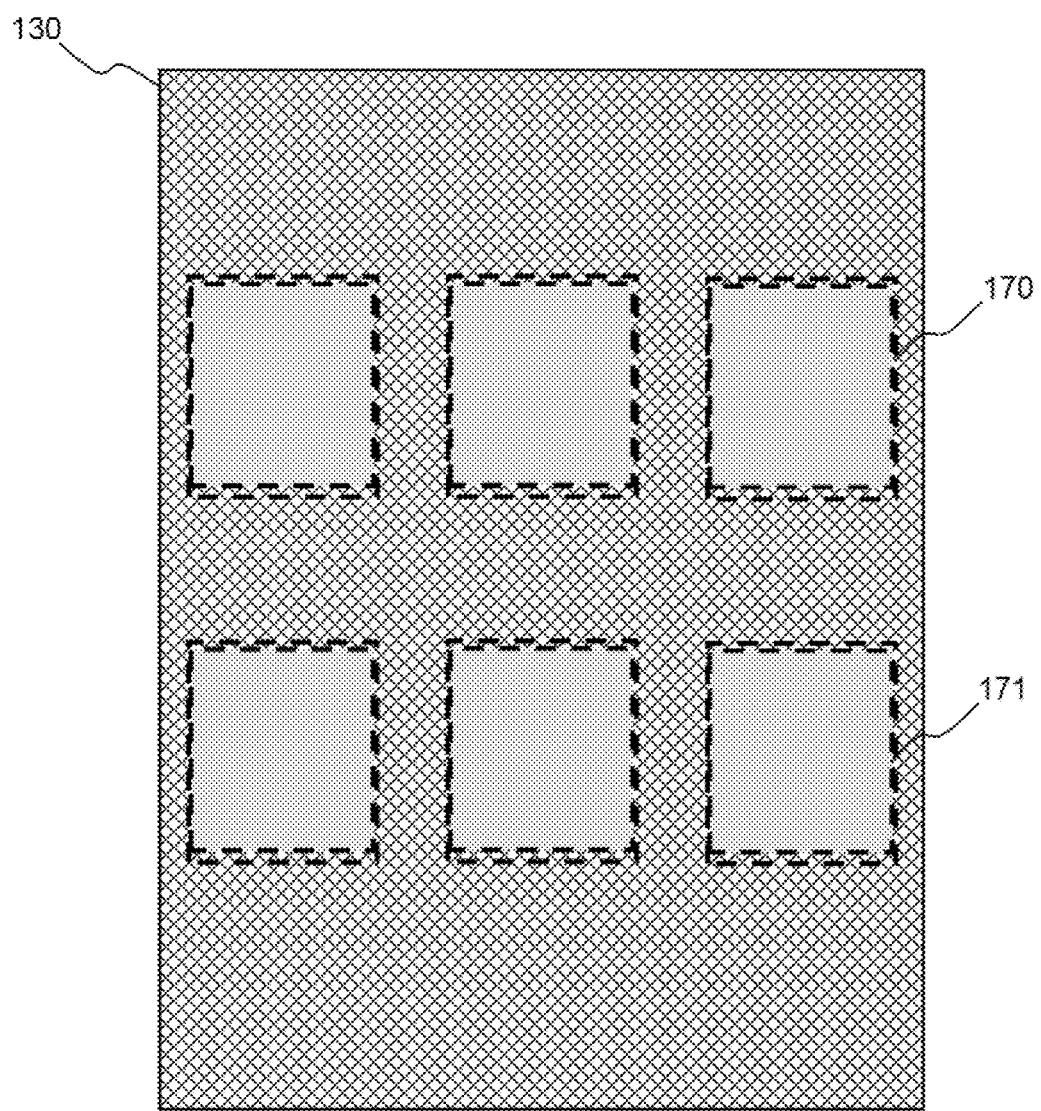

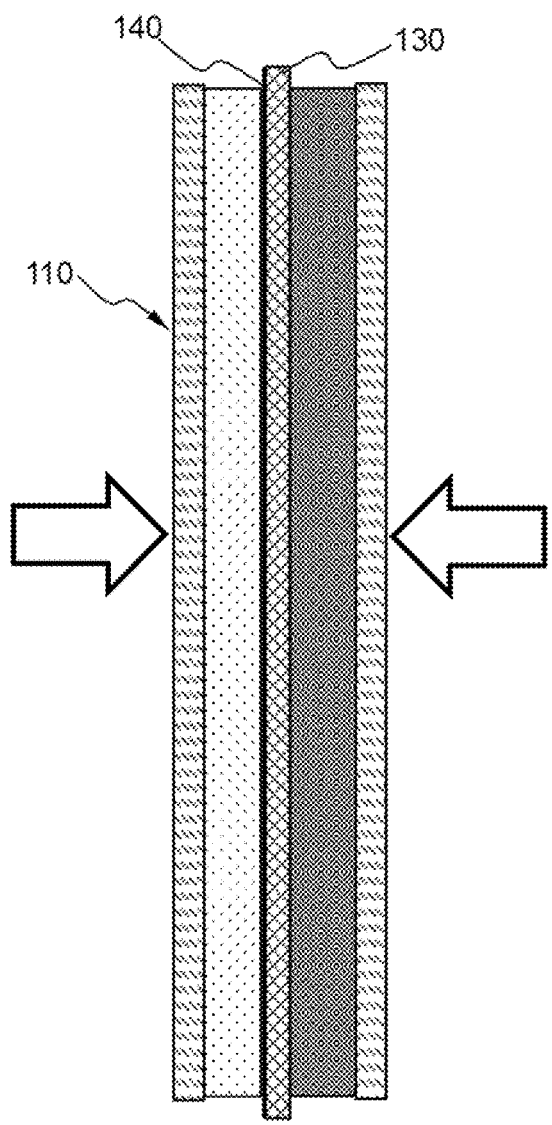
[FIG. 9]

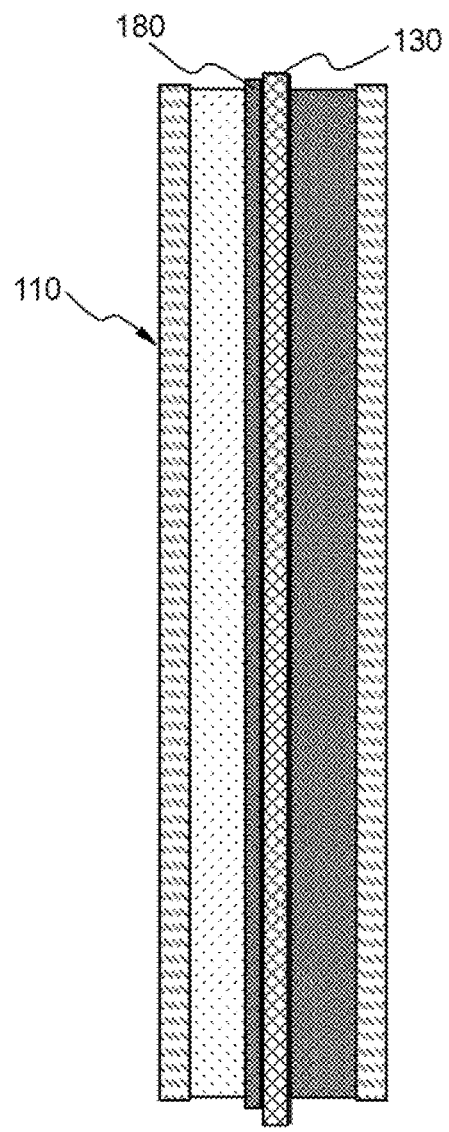
[FIG. 10]

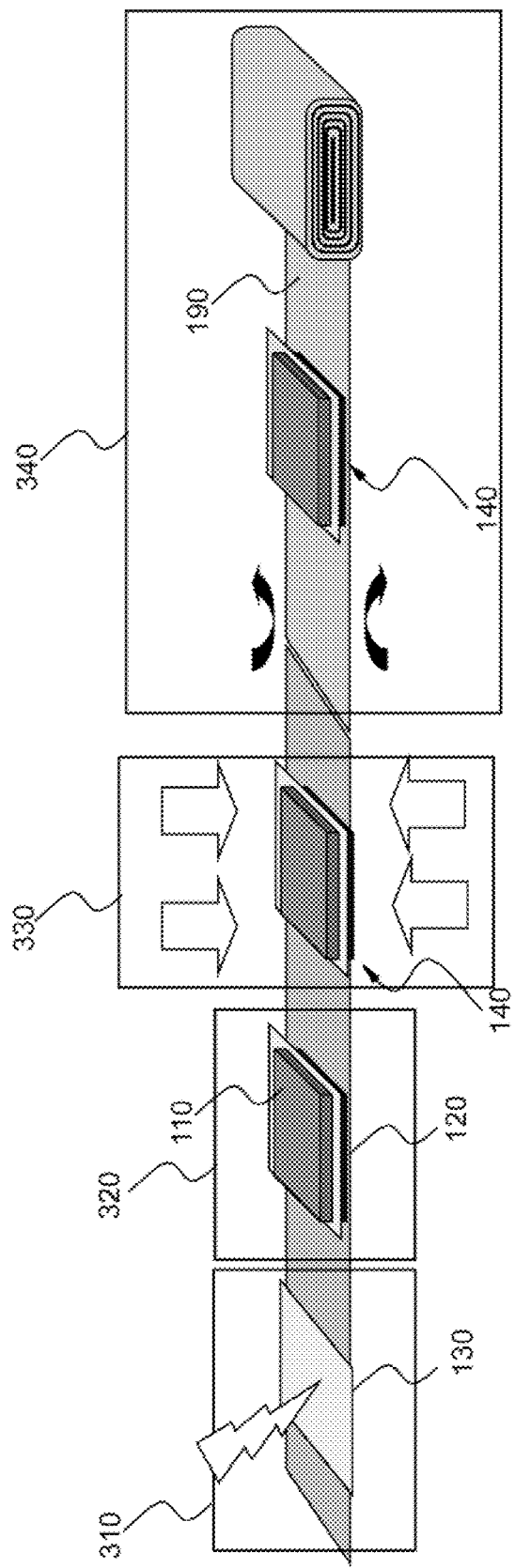
[FIG. 11]

[FIG. 12]

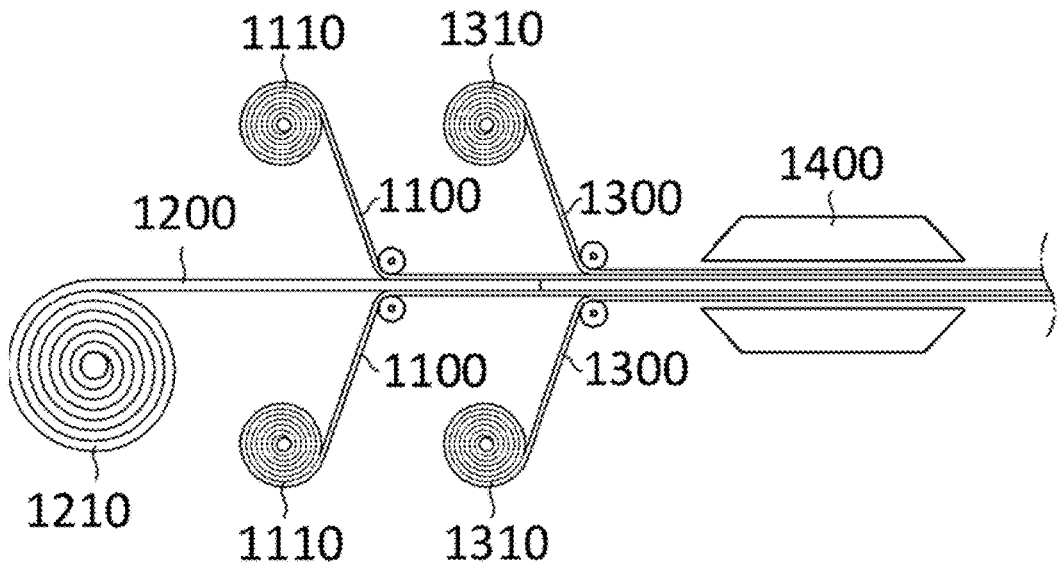

| 510 | PROCESS (A) OF PERFORMING CORONA DISCHARGE TO BOTH SURFACES OF SEPARATOR 130 WITH CORONA DISCHARGING APPARATUS 310 TO MODIFY SURFACES OF SEPARATOR 130 |

↓

| 520 | PROCESS (B) OF POSITIONING ELECTRODES 110 AND 120 TO FACE BOTH SURFACES OF SEPARATOR 130 IN LAMINATING SECTION 320 |

↓

| 530 | PROCESS (C) OF FORMING ELECTRODE-SEPARATOR UNIT 140 IN WHICH ELECTRODE 110 AND SEPARATOR 130 ARE PARTIALLY BONDED TO EACH OTHER BY APPLYING HEAT AND PRESSURE TO OUTER SURFACES OF RESPECTIVE ELECTRODES 110 AND 120 WHICH DO NOT FACE SEPARATOR 130 IN DIRECTION TOWARD INTERFACE 140 BETWEEN ELECTRODE 110 AND SEPARATOR 130 IN LAMINATION SECTION 330 |

↓

| 540 | PROCESS (D) OF SEQUENTIALLY WINDING AND LAMINATING BONDED ELECTRODE-SEPARATOR UNIT 140 BY SEPARATOR SHEET 190 ELONGATED IN ANY ONE DIRECTION IN FOLDING SECTION 340 |

[FIG. 14]
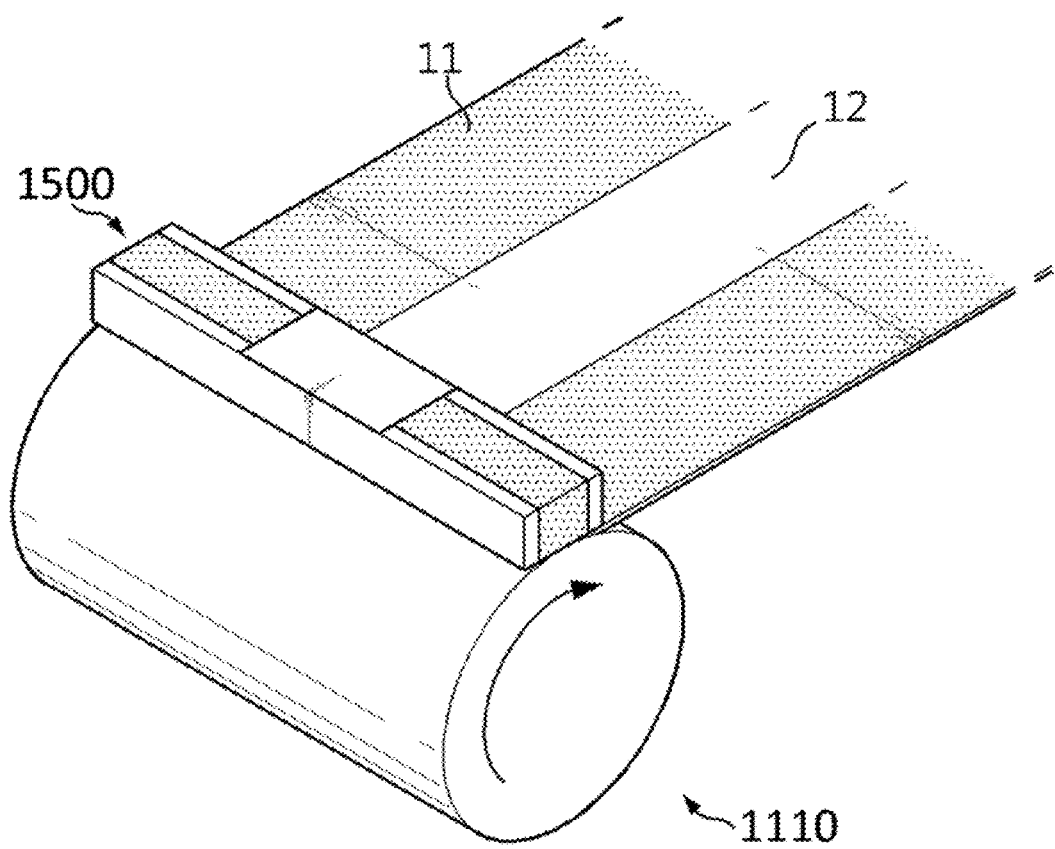

[FIG. 15]
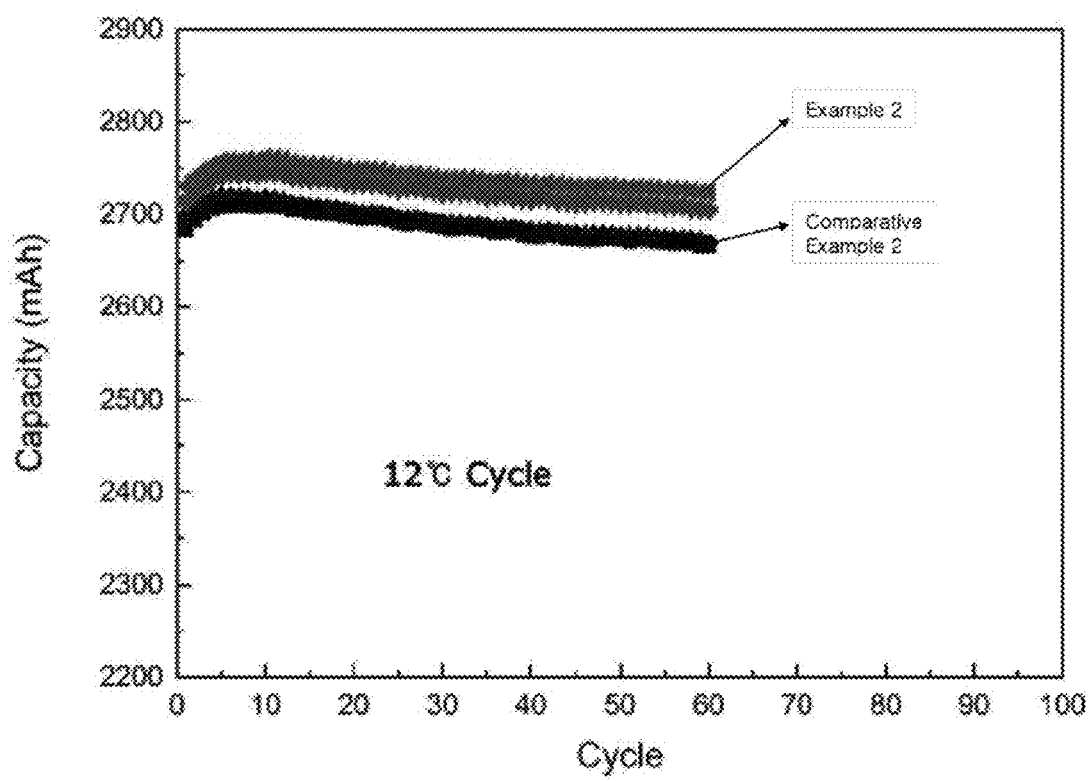
FIG. 16
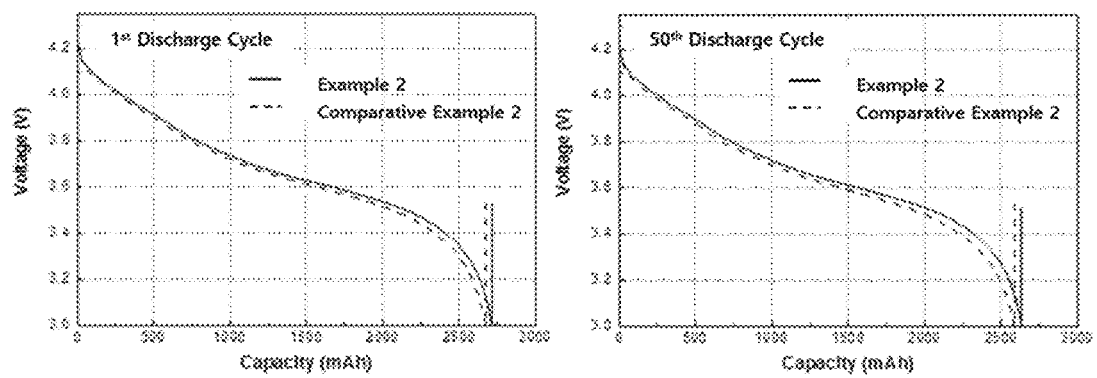

ELECTRODE ASSEMBLY INCLUDING ELECTRODE AND SEPARATOR PARTIALLY BONDED TO EACH OTHER

TECHNICAL FIELD

The present disclosure relates to an electrode assembly and more particularly, to an electrode assembly including an electrode and a separator partially bonded to each other.

BACKGROUND ART

Recently, there has been an increasing interest in energy storage technology. Batteries have been widely used in the fields of cellular phones, camcorders, notebook computers, and electric cars, resulting in intensive research and development into them. With the recent tendency toward miniaturization and weight-reduction of electronic devices, maintaining a high capacity as well as small size and light weight is the most interesting research field in secondary battery.

Secondary batteries may be classified according to the structure of an electrode assembly composed of a cathode, a separator, and an anode. For example, the secondary batteries are classified into a jelly-roll (wound type) electrode assembly in which long sheet type cathodes and long sheet type anodes are wound in a state in which separators are disposed respectively between the cathodes and the anodes, and a stacked type (laminated type) electrode assembly in which pluralities of cathodes and anodes each having a predetermined size are sequentially stacked in a state in which separators are disposed respectively between the cathodes and the anodes.

Lithium secondary batteries can be classified into a cylindrical battery cell, a prismatic battery cell, a pouch-shaped battery cell, and the like depending on a shape. The pouch-shaped battery cell has received a lot of attention due to low manufacturing costs, light weight, and easy reshaping and the use thereof has been continuously increased.

FIG. 1 illustrates an exploded perspective view of a conventional representative pouch-shaped secondary battery.

Referring to FIG. 1, a pouch-shaped secondary battery 10 may include a stacked type electrode assembly 20 from which a plurality of electrode tabs 21 and 22 is protruded, two electrode leads 30 and 31 connected to the electrode tabs 21 and 22, respectively, and a battery case 40 having a structure configured to accommodate and seal the stacked type electrode assembly 20 such that the electrode leads 30 and 31 are partially exposed to the outside.

Stress caused by expansion and contraction of electrodes during charging and discharging processes of a battery cell is accumulated in the electrode assembly, and when such stress accumulation exceeds a certain limit, the electrode assembly may be deformed. The deformation of the electrode assembly separates the electrodes and a separator and thus forms a space therebetween. In order to minimize or suppress the separation between the electrodes and the separator, more than predetermined adhesion is needed between the electrodes and the separator.

As a method for bonding the electrodes and the separator, a lamination process of bonding an electrode coated with an electrode active material and a separator by applying heat and/or pressure from the outside toward the inside or a technology of treating a separator with plasma has been suggested.

In the case where a bonding interface is entirely formed between the electrode and the separator through the lamination process, the bonding interface acts as a resistive layer within a battery cell, resulting in an increase in internal resistance of the battery cell. Further, excessive adhesion may cause deterioration of electrolyte impregnation and make it difficult to readily discharge a gas generated during a process.

Accordingly, a technology capable of solving the above-described problem while maintaining adhesion is needed.

SUMMARY OF INVENTION

Technical Problem

The present disclosure provides an electrode assembly in which an internal resistance can be decreased while adhesion between an electrode and a separator is maintained and a gas can be readily discharged while electrolyte impregnation is improved.

Solution to Problem

In an electrode assembly including a cathode, an anode, and a separator interposed between the cathode and the anode according to the present disclosure, at least one surface of the separator facing a respective one of the cathode and the anode is modified by a plasma discharging process. A bonding interface between the respective one of the cathode and the anode and the separator bonded by heating and/or compression is partially bonded to 30% to 90% of the size of an entire interface between the respective one of the cathode and the anode and the separator, and thus a great effect of the bonding interface as a resistive layer within a battery cell can be suppressed and an internal resistance the battery cell can be decreased.

The size of the partial bonding between the respective one of the cathode and the anode and the separator may account for desirably 50% to 90%, and more desirably 50% to 65% or 65% to 80% of the size of the entire interface between the respective one of the cathode and the anode and the separator. If the size of the partial bonding accounts for less than 30%, more than predetermined adhesion required by the present disclosure cannot be exhibited between the respective one of the cathode and the anode and the separator, and if the size of the partial bonding accounts for more than 90%, there is no difference in internal resistance from the conventional case where a bonding interface is entirely formed.

The separator may include: a porous substrate including a plurality of pores; and a porous coating layer including a plurality of inorganic particles and a polymer binder connecting and fixing the inorganic particles on at least one surface of the porous substrate.

Areas of the surface modified by the plasma discharging process are respectively positioned on both end borders of a surface of the porous coating layer, and a non-modified area is positioned between the respective modified areas.

The plasma discharge may be a corona discharge, and the corona discharge is carried out at 1.8 kV to 3 kV. Further, the corona discharge may be carried out using air, oxygen, nitrogen, or plasma as a processing source.

Various examples of the electrode assembly may include a stacked type electrode assembly in which the cathode and the anode are laminated with the separator interposed therebetween in a vertical direction with respect to a plane; or a stack-folding type electrode assembly obtained by positioning unit cells including the cathode, the anode, and the separator on a long separation film, followed by winding; or a lamination-stacked type electrode assembly in which unit cells are laminated and bonded in a vertical direction with respect to a plane.

In a specific example, an internal resistance of an electrode assembly may be decreased by partial bonding between the respective one of the cathode and the anode and the separator. In other words, as the size of bonding area between the respective one of the cathode and the anode and the separator is decreased, the internal resistance of the electrode assembly may be decreased. That is, the thickness of the separator is decreased during a lamination process for bonding the respective one of the cathode and the anode and the separator, and in this case, as the size of bonding area is decreased, the amount of decrease in porosity of the coating layer and fabric constituting the separator is decreased, and thus the internal resistance of the battery can be relatively decreased.

Further, the respective one of the cathode and the anode and the separator may be bonded such that the respective one of the cathode and the anode is not separated by gravity while the separator is fixed. If a bonding force is less, the respective one of the cathode and the anode and the separator may be separated during a manufacturing process of the electrode assembly, which makes it cumbersome to manufacture the electrode assembly, and the electrode assembly is likely to be deformed in structure during charging and discharging processes of the battery cell, which is not suitable.

In a specific example, the partial bonding between the respective one of the cathode and the anode and the separator may include a bonding gradient section in which a bonding force is gradually decreased. That is, a bonding interface formed by the partial bonding is not entirely uniform in bonding force, but includes a bonding gradient section in which a bonding force is gradually decreased, and thus the bonding force can be set to vary within the section.

Therefore, the bonding force can be increased in a section in which a separation force is likely to be generated between the respective one of the cathode and the anode and the separator and the bonding force can be decreased in a section in which the separation force is less likely to be generated, and thus the internal resistance of the electrode assembly can be decreased more efficiently.

Specifically, the bonding gradient section may include a bonding central portion having a relatively high bonding force on or around a horizontal axis passing through the center of the interface between the respective one of the cathode and the anode and the separator, and a bonding gradient portion in which a bonding force is gradually decreased from both ends of the bonding central portion toward an outer periphery of the interface.

Further, the bonding gradient section may be formed into a plurality of strips in a plane view.

Furthermore, the partial bonding between the respective one of the cathode and the anode and the separator may have a structure including a portion with a high bonding force formed into island shapes in a plane view.

In a specific example, a portion on the one surface or both surfaces of the separator modified by the plasma or corona discharge may correspond to a portion on the bonding interface between the respective one of the cathode and the anode and the separator bonded by heating and/or compression.

That is, the one surface or both surfaces of the separator may be chemically modified by introducing a polar functional group such as a carbonyl group, a carboxyl group, a hydroxyl group, a cyano group, etc. through the plasma or corona discharge, and thus a bonding force between the electrode and the separator can be increased, and if the surface-modified portion corresponds to a portion on the bonding interface between the electrode and the separator bonded by heating and/or compression, the bonding force can be further increased.

In a specific example, a pressure applied to the interface between the electrode and the separator may be 180 kg·f/m$^2$ to 780 kg·f/m$^2$, preferably 620 kg·f/m$^2$ to 720 kg·f/m$^2$.

In a specific example, the interface between the electrode and the separator may be heated at a temperature of 30° C. to 120° C., preferably 70° C. to 120° C.

In a specific example, an adhesive layer may be formed on the one surface or both surfaces of the separator facing the electrodes, and the adhesive layer may be partially melted into gel during heating and/or compression and thus may bond the electrode and the separator.

The present disclosure may also provide a method of manufacturing the electrode assembly for secondary battery.

Specifically, the method may include:

(a) a process of performing a corona discharge to one surface or both surfaces of the separator;

(b) a process of positioning the electrodes to face the one surface or both surfaces of the separator; and (c) a process of forming an electrode-separator unit in which the electrodes and the separator are partially bonded to each other by applying heat and/or pressure to outer surfaces of the respective electrodes which do not face the separator or an outer surface of the electrode which does not face the separator and an outer surface of the separator in a direction toward the interface between the electrode and the separator.

Further, according to another aspect of the present disclosure, there is provided a method of manufacturing an electrode assembly by unwinding each of an anode roll which is a wound anode; a cathode roll which is a wound cathode; and a separator roll which is a wound separator and positioning a structure of a cathode/a separator/an anode/a separator/a cathode and then inserting the structure into a laminating apparatus to make a lamination, in which the separator includes: a porous substrate including a plurality of pores; and a porous coating layer including a plurality of inorganic particles and a polymer binder connecting and fixing the inorganic particles on at least one surface of the porous substrate, and the method further includes a process of performing a plasma discharging process to a surface of the porous coating layer such that a non-processed area to which the plasma discharging process is not performed is formed on a central portion of the surface of the porous coating layer before unwinding the separator roll and inserting the unwound separator into the laminating apparatus.

Preferably, the plasma discharge may be a corona discharge.

Preferably, the corona discharge may be carried out at 1.8 kV to 3 kV.

Preferably, the corona discharge may be carried out using air, oxygen, nitrogen, or plasma as a processing source.

In a specific example, the electrode-separator unit may be a full cell having a structure in which a first electrode, a separator, and a second electrode are laminated in sequence, or a bi-cell having a structure in which a first electrode, a separator, a second electrode, a separator, and a first electrode are laminated in sequence. Further, the bi-cell may have a stacked type structure in which electrodes of the same kind are positioned on both sides of the cell, and for example, the bi-cell may be a cell including a cathode-a separator-an anode-a separator-a cathode or an anode-a separator-a cathode-a separator-an anode. The full cell has a stacked type structure in which electrodes of different kinds are positioned on both sides of the cell, and for example, the full cell may be a cell including a cathode-a separator-an anode.

In a specific example, the partial bonding may be achieved by applying at least one of heat and pressure only to a bonding portion.

Further, after the process (c), a process of sequentially winding and laminating the bonded electrode-separator unit by a separator sheet elongated in any one direction may be further performed.

The present disclosure may further provide a battery cell in which the above-described electrode assembly for secondary battery is provided with an electrolyte in a battery case.

Specifically, the battery cell may be a lithium secondary battery.

The lithium secondary battery may be, for example, a pouch-shaped battery cell in which an electrode assembly including a cathode, a separator, and an anode is sealed together with an electrolyte in a battery case, and may be generally formed into an approximately rectangular plate shape having a smaller thickness than a width. The pouch-shaped battery cell is typically configured as a pouch-shaped battery case, and the battery case has a laminate sheet structure in which an outer coating layer formed of a polymer resin having an excellent durability; a barrier layer formed of a metal material that shows barrier properties against moisture, air, etc.; and an inner sealant layer formed of a thermosetting polymer resin are laminated in sequence.

The cathode may be manufactured by, for example, coating and drying a mixture of a cathode active material, a conductor, and a binder on a cathode collector, and a filler may be further added to the mixture if necessary.

The cathode collector is typically formed to a thickness of 3 μm to 500 μm. The cathode collector is not particularly limited as long as it has a high conductivity without causing a chemical change to the battery, and may be formed of, for example, stainless steel, aluminum, nickel, titanium, sintered carbon, or stainless steel surface-treated with carbon, nickel, titanium, silver, etc. The collector may have micro roughness on its surface and thus improves adhesion of the cathode active material, and can be formed into various shapes such as film, sheet, foil, net, porous body, foam, non-woven fabric, etc.

The cathode active material is a material which can cause an electrochemical reaction and includes two or more transition metals as lithium transition metal oxides, and may be, for example, a layered compound, such as lithium cobalt oxide ($LiCoO_2$) and lithium nickel oxide ($LiNiO_2$) substituted with one or more transition metals; a lithium manganese oxide substituted with one or more transition metals; a lithium nickel-based oxide represented by Formula $LiNi_{1-y}M_yO_2$ (where M is Co, Mn, Al, Cu, Fe, Mg, B, Cr, Zn, or Ga and includes at least one of the elements, and $0.01 \leq y \leq 0.7$); a lithium nickel cobalt manganese complex oxide represented by Formula $Li_{1+z}Ni_bMn_cCo_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$ and $b+c+d<1$, M is Al, Mg, Cr, Ti, Si or Y, and A is F, P or Cl) such as $Li_{1+z}Ni_{1/3}Co_{1/3}Mn_{1/3}O_2$, $Li_{1+z}Ni_{0.4}Mn_{0.4}Co_{0.2}O_2$, etc.; an olivine-based lithium metal phosphate represented by Formula $Li_{1+x}M_{1-y}M'_yPO_{4-z}X_z$ (where M is a transition metal and preferably Fe, Mn, Co or Ni, M' is Al, Mg or Ti, X is F, S or N, $-0.5 \leq x \leq +0.5$, $0 \leq y \leq 0.5$, and $0 \leq z \leq 0.1$); and the like, but the present disclosure is not limited thereto.

The conductor is typically added in the amount of 1 to 20 wt % based on the total weight of the mixture including the cathode active material. The conductor is not particularly limited as long as it has conductivity without causing a chemical change to the battery, and may be formed of, for example, graphite such as natural graphite and synthetic graphite; carbon black such as carbon black, acetylene black, Ketjen black, channel black, furnace black, lamp black, thermal black, etc.; conductive fibers such as carbon fibers and metallic fibers; metallic powders such as carbon fluoride powder, aluminum powder, nickel powder, etc.; conductive whiskers such as zinc oxide, potassium titanate, etc.; conductive metal oxides such as titanium oxide; and conductive materials such as polyphenylene derivatives, etc.

The filler is used as a component to inhibit expansion of the cathode and is selectively used, and the filler is not particularly limited as long as it is a fibrous material and does not cause a chemical change to the battery, and may be formed of, for example, olefin-based polymers such as polyethylene, polypropylene, etc.; and fibrous materials such as glass fiber, carbon fiber, etc.

The anode collector is typically formed to a thickness of 3 μm to 500 μm. Further, like the cathode collector, the anode collector may have micro roughness on its surface and thus improves adhesion of the anode active material, and can be formed into various shapes such as film, sheet, foil, net, porous body, foam, non-woven fabric, etc.

The separator is disposed between the cathode and the anode, and an insulating thin film having a high ion permeability and mechanical strength is used as the separator. The separator typically has a pore diameter of 0.01 μm to 10 μm and a thickness of 5 μm to 300 μm. As the separator, sheets or non-woven fabrics formed of an olefin polymer, such as polypropylene, having a chemical resistance and hydrophobicity, glass fibers or polyethylene may be used. In the case where a solid electrolyte such as a polymer is employed as the electrolyte, the solid electrolyte may also serve as the separator.

The separator may include: a porous substrate including a plurality of pores; and a porous coating layer including a plurality of inorganic particles and a polymer binder connecting and fixing the inorganic particles on at least one surface of the porous substrate.

The porous substrate may be formed of a polyolefin-based polymer. The thickness of the porous substrate is not particularly limited, but may be, for example, 2 μm to 20 μm, and a pore size and porosity of the porous substrate are also not particularly limited, but may be, for example, 0.01 μm to 0.5 μm and 20% to 70%, respectively.

The inorganic particles used for forming the porous coating layer are not particularly limited as long as they are electrochemically stable. That is, the inorganic particles which can be used in the present disclosure are not particularly limited as long as an oxidation and/or a reduction reaction do not occur in an operating voltage range (for example, 0 V to 5 V based on $Li/Li^+$) of an applied electrochemical device. Particularly, in the case where inorganic particles having an ion transfer ability are used, performance improvement can be promoted by increasing an ion conductance in the electrochemical device.

In addition, in the case where inorganic particles having a high dielectric constant are used as the inorganic particles, the ion conductance of the electrolyte can be enhanced by the inorganic particles contributing to an increase in the degree of dissociation of an electrolyte salt, for example, a lithium salt, in the liquid electrolyte.

Due to the reasons described above, the inorganic particles preferably include high dielectric constant inorganic particles having a dielectric constant of 5 or higher, preferably 10 or higher, inorganic particles having a lithium ion transfer ability, or a mixture thereof. Non-limiting examples of the inorganic particles having a dielectric constant of 5 or higher include $BaTiO_3$, $Pb(Zr,Ti)O_3$(PZT), $Pb_{1-x}La_xZr_{1-y}Ti_yO_3$ (PLZT, where $0<x<1$ and $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, SiC, and $TiO_2$ alone or a mixture of two or more thereof.

Particularly, the inorganic particles such as $BaTiO_3$, $Pb(Zr,Ti)O_3$(PZT), $Pb_{1-x}La_xZr_{1-y}Ti_yO_3$ (PLZT, where $0<x<1$ and $0<y<1$), $Pb(Mg_{1/3}Nb_{2/3})O_3$—$PbTiO_3$(PMN-PT) and hafnia ($HfO_2$) described above show high dielectric constant characteristics with a dielectric constant of 100 or higher, and can also promote the safety improvement of the electrochemical device by having piezoelectricity in which a potential difference occurs between both surfaces by generating charges when tensioned and compressed by applying a predetermined pressure, and thereby suppressing the occurrence of short circuit inside both electrodes caused by external shock. Further, in the case where the above-described high dielectric constant inorganic particles and inorganic particles having a lithium ion transfer ability are used together, the synergy effect thereof can be redoubled.

In an aspect of the present disclosure, the inorganic particles having a lithium ion transfer ability refer to inorganic particles that include a lithium element, but do not store lithium and have a function to transfer lithium ions. The inorganic particles having a lithium ion transfer ability may transfer and move the lithium ions due to a kind of defect present inside the particle structure, and thus the lithium ion conductance in the battery is enhanced, and as a result, the performance improvement of the battery can be achieved. Non-limiting examples of the inorganic particles having a lithium ion transfer ability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$—$Li_2S$—$SiS_2$, $P_2S_5$-based glass ($Li_xP_yS_z$, $0<x<3$, $0<y<3$, $0<z<7$) such as $LiI$—$Li_2S$—$P_2S_5$, or a mixture of one or more thereof.

In the separator according to an aspect of the present disclosure, the size of the inorganic particles in the porous coating layer is not limited, but preferably has a range of 0.2 μm to 5 μm, if possible, for the formation of a coating layer with a uniform thickness, and proper porosity. If the size satisfies the above-described range, the inorganic particles have a proper dispersibility and it becomes easy to control the properties of the separator and a porous coating layer having a proper thickness can be formed, and thus mechanical properties thereof do not deteriorate. The thickness of the porous coating layer including the inorganic particles and the polymer binder is not particularly limited, but may be in the range of, for example, 1 μm to 10 μm.

A structure of the battery cell and a method of manufacturing the battery cell are known in the art. Therefore, detailed explanation thereof will be omitted in the present disclosure.

BRIEF DESCRIPTION OF DRAWINGS

FIG. 1 is an exploded perspective view of a conventional representative pouch-shaped secondary battery.

FIG. 2 is a side view illustrating an electrode assembly for secondary battery according to an exemplary embodiment of the present disclosure.

FIG. 3 is a side view illustrating an electrode-separator unit of an electrode assembly for secondary battery according to an exemplary embodiment of the present disclosure.

FIG. 4, FIG. 5, and FIG. 6 are plane views illustrating some components of an electrode-separator unit of an electrode assembly for secondary battery according to an exemplary embodiment of the present disclosure.

FIG. 7 is a side view illustrating an electrode-separator unit of an electrode assembly for secondary battery according to an exemplary embodiment of the present disclosure.

FIG. 8 is a plane view illustrating some components of an electrode-separator unit of an electrode assembly for secondary battery according to another exemplary embodiment of the present disclosure.

FIG. 9 is a side view illustrating an electrode-separator unit of an electrode assembly for secondary battery according to an exemplary embodiment of the present disclosure.

FIG. 10 is a side view illustrating an electrode-separator unit of an electrode assembly for secondary battery according to yet another exemplary embodiment of the present disclosure.

FIG. 11 is a process diagram illustrating a manufacturing process of an electrode assembly for secondary battery according to yet another exemplary embodiment of the present disclosure.

FIG. 12 is a view schematically illustrating a manufacturing process of an electrode assembly according to an exemplary embodiment of the present disclosure.

FIG. 13 is a flowchart illustrating a manufacturing process of an electrode assembly for secondary battery according to an exemplary embodiment of the present disclosure.

FIG. 14 is a view schematically illustrating a plasma discharging process with respect to a separator according to an exemplary embodiment of the present disclosure.

FIG. 15 is a graph illustrating the measurement result of a battery capacity during a charge and discharge cycle in Example 2 and Comparative Example 2 according to a test example of the present disclosure.

FIG. 16 provides graphs illustrating discharge profiles for a 1st cycle and a 50th cycle in Example 2 and Comparative Example 2 according to a test example of the present disclosure.

DESCRIPTION OF EMBODIMENTS

FIG. 5 and FIG. 6 are plane views of a separator according to an exemplary embodiment of the present disclosure. Referring to FIG. 5 and FIG. 6, a surface of a porous coating layer in the separator according to the present disclosure includes processed areas 11 to which a plasma discharging process is performed and a non-processed area 12 to which the plasma discharging process is not performed. The surface of the porous coating layer is activated by the plasma discharging process, and thus adhesion between an electrode and the separator can be improved. Further, according to the present disclosure, the plasma discharging process is performed along a pattern, and thus a non-processed area to which the plasma discharging process is not performed is formed. Therefore, electrolyte impregnation can be improved and gas generated during a manufacturing process can be readily discharged.

Referring to FIG. 5, the processed areas 11 are respectively positioned on both end borders of the surface of the porous coating layer, and the non-processed area 12 may be positioned between the respective processed areas 11. Further, referring to FIG. 6, the plasma discharging process may be performed along a pattern and a plurality of non-processed areas 12 may be formed.

FIG. 12 schematically illustrates a manufacturing process of an electrode assembly according to an exemplary embodiment of the present disclosure. Referring to FIG. 12, each of an anode roll 1210 which is a wound anode 1200; a cathode roll 1310 which is a wound cathode 1300; and a separator roll 1110 which is a wound separator 1100 is unwound and positioned as a structure of a cathode/a separator/an anode/a separator/a cathode and then inserted into a laminating apparatus 1400 so as to be manufactured into an electrode assembly.

The separator includes: a porous substrate including a plurality of pores; and a porous coating layer including a plurality of inorganic particles and a polymer binder connecting and fixing the inorganic particles on at least one surface of the porous substrate.

FIG. 14 schematically illustrates a plasma discharging process with respect to a separator according to an exemplary embodiment of the present disclosure. Referring to FIG. 14, a method of manufacturing an electrode assembly according to the present disclosure further includes a process of performing a plasma discharging process to the surface of the porous coating layer such that the non-processed area 12 to which the plasma discharging process is not performed is formed on a central portion of the surface of the porous coating layer by using a plasma discharging apparatus 1500 before unwinding the separator roll 1110 and inserting the unwound separator into the laminating apparatus. According to the present disclosure, the plasma discharging process is performed along a pattern, and thus a non-processed area to which the plasma discharging process is not performed is formed. Therefore, electrolyte impregnation can be improved and gas generated during a manufacturing process can be readily discharged.

The plasma discharge according to an aspect of the present disclosure may be a corona discharge.

The corona discharge may be carried out at 1.8 kV to 3 kV. In the case where a discharge voltage is too low, corona effects cannot be uniformly applied, and in the case where a discharge voltage is too high, a corona discharging apparatus may not readily operate, which is not preferable.

The corona discharge may be carried out using various processing sources such as air, oxygen ($O_2$), or nitrogen ($N_2$). Through the corona process, synergy between physical surface modification caused by the discharge and chemical surface modification caused by the generation of functional groups can result in remarkable improvement of impregnation. Such chemical surface modification occurs when high-energy electrons or ions collide to generate radicals or ions on a separator substrate and air, oxygen, nitrogen, ozone, moisture, etc. around the radicals or ions react to introduce a polar functional group such as a carbonyl group, a carboxyl group, a hydroxyl group, a cyano group, etc.

The corona process may be carried out using polymer plasma as the surface processing source. That is, in the case where particles having a high energy in a plasma state collide with a surface of the separator substrate, the energy is transferred to the surface of the separator substrate and the separator substrate may be activated chemically or physically so as to improve adhesion between polymer mixture layers.

EMBODIMENTS

Hereinafter, the present disclosure will be described in detail. Prior to the detailed description, it should be appreciated that terms and words used in the present specification and claims are not to be construed as a general or dictionary meaning, but are to be construed to meaning and concepts meeting the technical ideas of the present disclosure based on a principle that the inventors can appropriately define the concepts of terms in order to describe their own inventions in the best manner. Accordingly, description of this specification and illustrations of the drawings are merely given as an exemplary embodiment of the present disclosure and are not intended to represent all technical ideas of the present disclosure. Therefore, it should be understood that various equivalents and modifications can exist which can replace the embodiments described at the time of application.

FIG. 2 is a side view illustrating an electrode assembly for secondary battery according to an exemplary embodiment of the present disclosure.

Referring to FIG. 2, an electrode assembly 100 for secondary battery according to the present disclosure includes an electrode-separator unit 140 in which an electrode and a separator are bonded to each other.

Specifically, the electrode assembly 100 for secondary battery includes an electrode 110 including a current collector 112 of which both surfaces are coated with an electrode mixture 114 containing an electrode active material, an electrode 120 including a current collector 122 of which both surfaces are coated with an electrode mixture 124 containing an electrode active material, and a separator 131 disposed on one surface of the current collector 122 of the electrode 120 coated with the electrode mixture 124, or a separator 130 interposed between the electrodes 110 and 120.

FIG. 3 is a side view illustrating an electrode-separator unit of an electrode assembly for secondary battery according to an exemplary embodiment of the present disclosure, and FIG. 4 is a plane view illustrating some components of an electrode-separator unit of an electrode assembly for secondary battery according to an exemplary embodiment of the present disclosure.

Referring to FIG. 3 and FIG. 4, surfaces 160 of both sides 132 and 135 of the separator 130 facing the electrode 110, 120, including the current collector 112 coated with the electrode mixture 114, are modified by a corona discharge.

Further, a bonding interface 140 between the electrode 110, 120 and the separator 130 bonded by heating and/or compression is partially bonded to 30% to 90% of the size of an entire interface between the electrode 110, 120 and the separator 130.

Therefore, according to the present disclosure, an internal resistance of the electrode assembly 100 is decreased by the partial bonding between the electrode 110 and the separator 130. In other words, as the size of bonding area between the electrode 110 and the separator 130 is decreased, the internal resistance of the electrode assembly 100 is decreased. Further, the electrode 110 and the separator 130 may be bonded such that the electrode 110 is not separated by gravity while the separator 130 is fixed.

Further, the partial bonding between the electrode 110 and the separator 130 includes a bonding gradient section 150 in which a bonding force is gradually decreased. The bonding gradient section 150 includes a bonding central portion 151 having a relatively high bonding force on or around a horizontal axis P passing through the center of the interface between the electrode 110 and the separator 130, and a bonding gradient portion 152 in which a bonding force is gradually decreased from both ends of the bonding central portion 151 toward an outer periphery of the interface 140.

Furthermore, the bonding gradient section 150 is formed into a plurality of strips 153, 154, and 155 in a plane view.

Portions 161, 162, and 163 on one surface of the separator 130 modified by the corona discharge may respectively correspond to portions 153, 154, and 155 on the bonding interface between the electrode 110 and the separator 130 bonded by heating and/or compression.

FIG. 7 is a side view illustrating an electrode-separator unit of an electrode assembly for secondary battery according to an exemplary embodiment of the present disclosure, and FIG. 8 is a plane view illustrating some components of an electrode-separator unit of an electrode assembly for secondary battery according to another exemplary embodiment of the present disclosure.

Referring to FIG. 7 and FIG. 8, partial bonding between the electrode 110 and the separator 130 in the electrode-separator unit 210 has a structure including a portion with a high bonding force formed into island shapes 170 and 171 in a plane view.

FIG. 9 is a side view illustrating an electrode-separator unit of an electrode assembly for secondary battery according to an exemplary embodiment of the present disclosure.

Referring to FIG. 9, a pressure applied to the interface 140 between the electrode 110 and the separator 130 may be 180 kg·f/m² to 780 kg·f/m², and in this case, the interface 140 between the electrode 110 and the separator 130 may be heated at a temperature of 30° C. to 120° C.

FIG. 10 is a side view illustrating an electrode-separator unit of an electrode assembly for secondary battery according to yet another exemplary embodiment of the present disclosure.

Referring to FIG. 10, an adhesive layer 180 may be formed on one surface of the separator 130 facing the electrode 110, and the adhesive layer 180 may be partially melted into gel during heating and compression and thus may bond the electrode 110 and the separator 130.

FIG. 11 is a process diagram illustrating a manufacturing process of an electrode assembly for secondary battery according to yet another exemplary embodiment of the present disclosure, and FIG. 13 is a flowchart illustrating a manufacturing process of an electrode assembly for secondary battery according to an exemplary embodiment of the present disclosure.

Referring to FIG. 11 and FIG. 13, a method 500 of manufacturing an electrode assembly for secondary battery according to the present disclosure includes a process 510 of performing a corona discharge to both surfaces of the separator 130 with a corona discharging apparatus 310 to modify the surfaces of the separator 130, a process 520 of positioning the electrodes 110 and 120 to face the both surfaces of the separator 130 in a laminating section 320, a process 530 of forming the electrode-separator unit 140 in which the electrode 110 and the separator 130 are partially bonded to each other by applying heat and pressure to outer surfaces of the respective electrodes 110 and 120 which do not face the separator 130 in a direction toward the interface 140 between the electrode 110 and the separator 130 in a lamination section 330, and a process 540 of sequentially winding and laminating the bonded electrode-separator unit 140 by a separator sheet 190 elongated in any one direction in a folding section 340.

In this case, the electrode-separator unit 140 has a full cell structure or a bi-cell structure.

Hereinafter, the present disclosure will be described with reference to Examples, Comparative Examples, and Test Examples. However, these examples are provided only for better understanding of the present disclosure, but do not limit the scope of the present disclosure.

EXAMPLES

Example 1

A cathode containing a cathode active material and an anode containing an anode active material were prepared, and a separator including a porous coating layer containing $SiO_2$ particles and PVdF and having a thickness of 5 µm formed on both surfaces of a polyolefin substrate having a thickness of 20 µm was prepared. A corona discharging process was performed to the separator along a pattern such that a non-processed area was formed on a central portion 26 mm away from each of both ends. The separator was interposed between the cathode and the anode to manufacture an electrode assembly having a size of 84 mm×84 mm.

Comparative Example 1

An electrode assembly was manufactured in the same manner as Example 1 except that the corona discharging process was performed to an entire surface of a separator.

<Measurement of Electrolyte Impregnation>

A lithium non-aqueous electrolyte having ethylene carbonate and ethyl methyl carbonate mixed at a volume ratio of 3:7 and containing 1 M $LiPF_6$ as a lithium salt was prepared. The electrolyte was injected into a chamber, and each of the electrode assemblies manufactured in Example 1 and Comparative Example 1 was submerged in the electrolyte and impregnated for 10 minutes. The maximum height of the electrolyte impregnated from an end of the separator and the area of impregnation were measured, and the results of measurement were as shown in the following Table 1.

TABLE 1

| Classification | Height of impregnated electrolyte (mm) | Area of impregnated electrolyte (mm) (%) |
|---|---|---|
| Example 1 | 33.0 (non-processed area) 10.5 (processed area) | 54.7 |
| Comparative Example 1 | 10 | 43.0 |

Referring to Table 1, it can be seen that in Comparative Example 1 in which the corona discharging process was performed to the entire surface of the separator, the height of the impregnated electrolyte was 10 mm and the area of the impregnated electrolyte was 43%, and in Example 1 in which the corona discharging process was performed along a pattern, the non-processed area served as an electrolyte path, and thus the height of the impregnated electrolyte and the area of the impregnated electrolyte were improved to 33 mm and 54.7%, respectively.

Example 2

A cathode mixture slurry was prepared by adding a cathode active material (e.g., LiCoO$_2$) with a conductor and a binder (PVdF) at a weight ratio of 95:2.5:2.5 (active material: conductor: binder) to a solvent NMP (N-methyl-2-pyrrolidone), and an anode mixture slurry was prepared by adding synthetic graphite of 95 wt % as an anode active material, a conductor (Super-P) of 1.5 wt %, and a binder (PVdF) of 3.5 wt % to a solvent NMP and then coated, dried, and compressed on aluminum foil and copper foil, respectively, to prepare a cathode and an anode.

A separator was prepared using porous polyethylene, and surfaces of both sides of the separator facing the cathode and the anode were modified by a corona discharge. The porous polyethylene separator was interposed between the cathode and the anode and then heated and compressed such that a bonding interface between the electrode and the separator bonded to each other was partially bonded to 90% of the size of an entire interface between the electrode and the separator, and thus an electrode-separator unit was prepared. In this case, a portion of the separator which was surface-modified by the corona discharge was formed corresponding to a portion on the bonding interface between the electrode and the separator bonded by heating and compression. The prepared electrode-separator unit was sequentially wound and laminated by a separator sheet elongated in any one direction to manufacture an electrode assembly.

Further, the manufactured electrode assembly was accommodated in a battery case, and an electrolyte containing 1 M LiPF$_6$ was injected to a solvent containing EC, EMC and DEC at a ratio of 1:2:1 to manufacture a battery cell.

Comparative Example 2

A battery cell was manufactured in the same manner as Example 2 except that a bonding interface between an electrode and a separator bonded to each other by heating and compression was bonded to the size of an entire interface between the electrode and the separator.

During a charge and discharge cycle, a constant current CC of 0.2 C was charged to reach 4.1 V, a constant voltage CV of 4.1 V was continuously charged to reach 0.2 C or less, and a constant current of 0.4 C was charged again to reach 4.2 V and a constant voltage of 4.2 V was continuously charged to reach 0.2 C or less, and a constant current of 0.2 C was charged to reach 4.35 V and a constant voltage of 4.35 V was charged to reach 0.05 C or less and then charging was ended, and a contestant current of 0.5 C was discharged to reach 3.0 V and then discharging was ended. The battery cells of Example 2 and Comparative Example 2 were charged and discharged 60 times according to the charge and discharge cycle, and a battery capacity for each cycle was measured as illustrated in the graph of FIG. 15. Further, discharge profiles for a 1st cycle and a 50th cycle in Example 2 and Comparative Example 2 were as illustrated in the graphs of FIG. 16.

As illustrated in FIG. 15, in Example 2 in which the electrode and the separator were partially bonded, an initial battery cell capacity was increased by 1.4% in the 1st cycle and a battery capacity was higher from the 1st cycle to a 60th cycle as compared with Comparative Example 2 in which the electrode and the separator were bonded to the size of the entire interface. Further, as shown in the discharge profiles for the 1st cycle and the 50th cycle in FIG. 16, it can be seen that an internal resistance of the battery cell of Example 2 was decreased as compared with Comparative Example 2.

INDUSTRIAL APPLICABILITY

The present disclosure relates to an electrode assembly in which an internal resistance can be decreased while adhesion between an electrode and a separator of a battery is maintained and electrolyte impregnation can be improved, and provides a separator for lithium secondary battery of which a surface includes a processed area to which a corona discharging process is performed and a non-processed area to which the corona discharging process is performed and a method of manufacturing an electrode assembly including the same, and thus can be industrially applied.

The invention claimed is:

1. An electrode assembly for a secondary battery, comprising:
    a cathode;
    an anode; and
    a separator interposed between the cathode and the anode,
    wherein at least one surface of the separator facing a respective one of the cathode and the anode is modified by a plasma discharging process,
    wherein a bonding interface between the respective one of the cathode and the anode and the separator bonded by heating and/or compression on an entire interface area is partially bonded to 30% to 90% of the size of an entire interface between the respective one of the cathode and the anode and the separator, and
    wherein a modified portion by the plasma discharging process and a non-modified portion by the plasma discharging process are configured in a strip form.

2. The electrode assembly for secondary battery of claim 1, wherein the separator includes:
    a porous substrate including a plurality of pores; and
    a porous coating layer including a plurality of inorganic particles and a polymer binder connecting and fixing the inorganic particles on at least one surface of the porous substrate.

3. The electrode assembly for secondary battery of claim 2, wherein areas of the surface modified by the plasma discharging process are respectively positioned on both end borders of a surface of the porous coating layer, and a non-modified area is positioned between the respective modified areas.

4. The electrode assembly for secondary battery of claim 1, wherein the plasma discharge is a corona discharge.

5. The electrode assembly for secondary battery of claim 1, wherein the electrode assembly is:
    a stacked type electrode assembly in which the cathode and the anode are laminated with a separator interposed therebetween in a vertical direction with respect to a plane; or
    a stack-folding electrode assembly obtained by positioning unit cells including the cathode, the anode, and the separator on a long separation film, followed by winding; or
    a lamination-stacked type electrode assembly in which unit cells are laminated and bonded in a vertical direction with respect to a plane.

6. The electrode assembly for secondary battery of claim 1, wherein the size of the partial bonding between the respective one of the cathode and the anode and the separator account for 50% to 90% of the size of an entire interface between the respective one of the cathode and the anode and the separator.

7. The electrode assembly for secondary battery of claim 1, wherein the respective one of the cathode and the anode and the separator are bonded such that the respective one of the cathode and the anode is not separated by gravity while the separator is fixed.

8. The electrode assembly for secondary battery of claim 1, wherein the partial bonding between the respective one of the cathode and the anode and the separator includes a bonding gradient section in which a bonding force is gradually decreased.

9. The electrode assembly for secondary battery of claim 8, wherein the bonding gradient section includes a bonding central portion having a relatively high bonding force on or around a horizontal axis passing through the center of the interface between the respective one of the cathode and the anode and the separator, and a bonding gradient portion in which a bonding force is gradually decreased from both ends of the bonding central portion toward an outer periphery of the interface.

10. The electrode assembly for secondary battery of claim 8, wherein the bonding gradient section is formed into a plurality of strips in a plane view.

11. The electrode assembly for secondary battery of claim 1, wherein the partial bonding between the respective one of the cathode and the anode and the separator has a structure including a portion with a high bonding force formed into island shapes in a plane view.

12. A method of manufacturing an electrode assembly for a secondary battery of claim 1, comprising:
   (a) a process of performing a plasma discharge to one surface or both surfaces of a separator;
   (b) a process of positioning electrodes to face the one surface or both surfaces of the separator; and
   (c) a process of forming an electrode-separator unit in which the electrodes and the separator are partially bonded to each other by applying heat and/or pressure to the entire outer surfaces of the respective electrodes which do not face the separator or an entire outer surface of an electrode of the electrodes which does not face the separator and an outer surface of the separator in a direction toward the interface between the electrode and the separator.

13. The method of manufacturing an electrode assembly for secondary battery of claim 12, wherein when the heat is applied in the direction toward the entire interface between the electrode and the separator, the temperature of the interface between the electrode and the separator is 30° C. to 120° C.

14. The method of manufacturing an electrode assembly for secondary battery of claim 12, wherein the pressure applied to the interface between the electrode and the separator is 180 kg·f/m$^2$ to 780 kg·f/m$^2$.

15. The method of manufacturing an electrode assembly for secondary battery of claim 12, wherein the separator includes:
   a porous substrate including a plurality of pores; and
   a porous coating layer including a plurality of inorganic particles and a polymer binder connecting and fixing the inorganic particles on at least one surface of the porous substrate, and
   the plasma discharge is a corona discharge.

16. The method of manufacturing an electrode assembly for secondary battery of claim 12, wherein the process of forming an electrode-separator unit in which the electrode and the separator are partially bonded to each other by applying heat and/or pressure is performed to 30% to 90% of the size of an entire interface between the electrode and the separator.

* * * * *